UNITED STATES PATENT OFFICE.

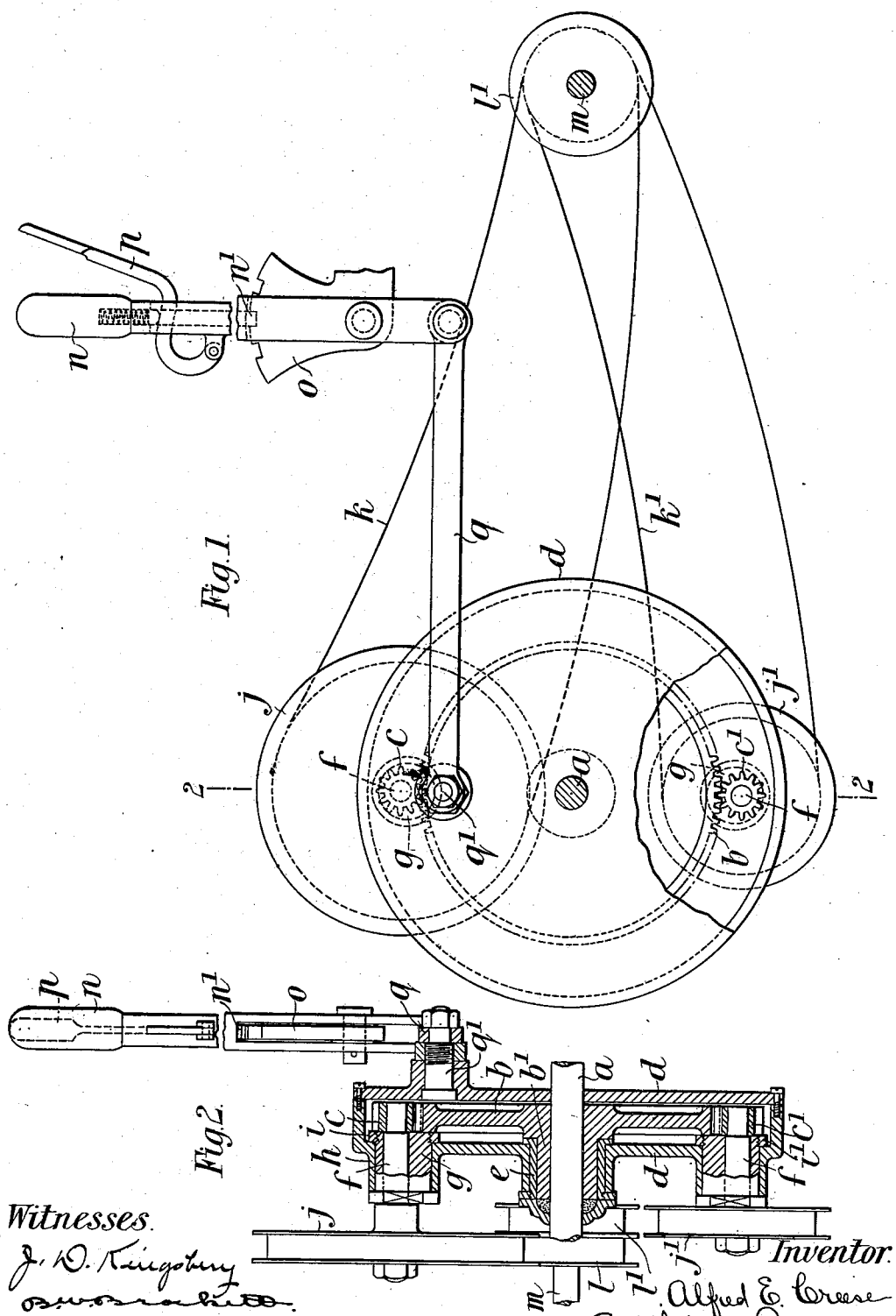

ALFRED EDWARD CREESE, OF LONDON, ENGLAND.

VARIABLE-SPEED DRIVING-GEAR.

SPECIFICATION forming part of Letters Patent No. 636,024, dated October 31, 1899.

Application filed August 7, 1899. Serial No. 726,466. (No model.)

*To all whom it may concern:*

Be it known that I, ALFRED EDWARD CREESE, a subject of the Queen of Great Britain, residing at London, England, have invented new and useful Improvements in Variable-Speed Driving-Gear, of which the following is a specification.

This invention relates to improvements in variable-speed driving-gear chiefly designed for use upon self-propelled road-vehicles.

According to the invention I construct my variable-speed gear of a toothed wheel keyed upon the driven shaft and gearing with two pinions preferably arranged diametrically opposite to one another, the said pinions being mounted in bearings in a frame or a casing surrounding the three gear-wheels. The frame or casing is loosely mounted upon the driven shaft, and each of the pinion shafts or spindles has keyed upon it a pulley, the said pulleys being connected by means of belts or the like to pulleys upon the crank or driving shaft of the motor driving the vehicle. Means, such as a rod and lever, are provided for swiveling or turning the loose frame or casing upon the driven shaft, and the belts are so arranged that when the line joining the axes of the two pinions is practically vertical the belts run loosely upon the pulleys, so that the vehicle is at rest. If, however, the lever be operated so as to swing the frame or casing in either direction upon the driven shaft, one or other of the belts will be tightened, so that the pinion corresponding thereto will operate the driven shaft. With this arrangement it will be obvious, therefore, that I can obtain two extreme speeds by having different diameters of pulleys upon the pinions or upon the driving-shaft and that by varying the tension of the operating-belt I can obtain any speed between the two above-mentioned limits. The pinions are preferably mounted eccentrically in bearing-bushes which are fitted into the frame or casing, so that by turning the said bushes the pinions can be adjusted to compensate for wear and prevent rattling. A nut or other suitable device can be used for locking the bushes in the positions to which they are adjusted. I can employ two or more such driving-gears, so as to obtain further speeds, and, if required, also provide for reversing the vehicle at any desired speed.

To enable my invention to be fully understood, I will describe it by reference to the accompanying drawings, in which—

Figure 1 is a sectional side elevation of variable-speed driving-gear constructed according to the invention; and Fig. 2 is a sectional end elevation thereof, the section being taken on the line 2 2, Fig. 1.

$a$ is the driven shaft, and $b$ is the toothed wheel, which is keyed thereon.

$c\ c'$ are the two pinions, which gear with the toothed wheel $b$, and $d$ is the frame or casing, which incloses the wheel $b$ and pinions $c\ c'$, the said casing $d$ being loosely mounted upon a bush $e$ upon the boss $b'$ of the toothed wheel $b$. Each of the pinions $c\ c'$ is keyed upon a spindle $f$, which is mounted eccentrically in a bush $g$, inserted in a sleeve or socket $h$, formed in the casing $d$, the said bush being held in position in the socket by the nuts $i\ i'$. The spindles $f\ f$ project through the frame or casing, and the projecting portion of each has keyed upon it a pulley. The said pulleys are lettered $j$ and $j'$, respectively, and the pulley $j$ is shown of larger diameter than the pulley $j'$.

$k\ k'$ are the belts, which extend from the pulleys $j\ j'$ to pulleys $l\ l'$ upon the driving-shaft $m$.

$n$ is the hand-lever for operating the driving-gear in the manner hereinafter explained. This hand-lever is pivoted to a toothed sector $o$ and is provided with a spring-pin $n'$, which is normally held in engagement with one of the teeth in the sector $o$, but can be released therefrom by means of the pivoted handle $p$. The short arm of the lever $n$ is pivoted to one end of a link $q$, the other end of which is pivoted to a stud $q'$, fitted to the casing $d$.

With this arrangement when the line joining the axes of the two pinions $c\ c'$ is practically vertical, as shown in the drawings, the two belts $k\ k'$ run loosely upon the pulleys $l\ l'$, so that no motion is transmitted from the driving-shaft to the toothed wheel $b$. If, however, the lever $n$ be operated so as to swing the frame or casing $b$ in either direction upon the driven shaft $a$, one or other of the belts will be tightened, so that the pinion corresponding thereto will operate the driven shaft. As the two pulleys are of different diameters, it will be obvious that the velocity of rotation communicated to the driven shaft will vary according to which of the belts is tightened and that by varying the tension of the operating-belt any speed between the two limits can be obtained.

By mounting the pinion-spindles $f\,f'$ eccentrically in the bushes $g\,g$ I am enabled by adjusting the said bushes in their sockets or sleeves to compensate for wear, and thereby prevent rattling.

Instead of making the pulleys $j\,j'$ of different diameters I can make the pulleys $l\,l'$ of different diameters. Furthermore, two or more driving-gears of the kind hereinbefore described can be employed upon one vehicle, whereby further speeds can be obtained, and when required I can also provide for reversing the vehicle at any desired speed by the employment, for example, of a crossed belt.

Having now particularly described and ascertained the nature of my said invention and in what manner the same is to be performed, I declare that what I claim is—

1. In a variable-speed driving-gear, the combination with a shaft, of a toothed wheel secured thereon, an adjustable frame loosely mounted on said shaft, two pinions mounted on said frame and meshing with said toothed wheel, and an independent pulley for each of said pinions, substantially as described.

2. In a variable-speed driving-gear, the combination with the driving-shaft, of a driven shaft, a toothed wheel secured thereon, a frame loosely mounted on said driven shaft, two pinions mounted on said frame, and meshing with said toothed wheel, an independent pulley connected with each of said pinions, operative connections between the said pulleys and the driving-shaft, and adjusting devices connected with said frame, substantially as described.

3. In a variable-speed driving-gear, the combination with the driving-shaft, of a driven shaft, a toothed wheel secured thereon, a frame loosely mounted on said driven shaft, two pinions mounted on said frame and meshing with said toothed wheel, an independent pulley connected with each of said pinions, belts extending from said pulleys to the driving-shaft, and adjusting devices connected to said frame whereby one or the other of said belts may be tightened, substantially as described.

4. In a variable-speed driving-gear, the combination with the driving-shaft provided with driving-pulleys, of a driven shaft, a toothed wheel keyed thereon, a movable frame loosely mounted on said driven shaft, two pinions mounted on said frame on opposite sides of the toothed wheel and meshing therewith, two pulleys of different sizes connected each with one of said pinions, belts connecting said pulleys with the driving-pulleys on the driving-shaft, a shifting lever, and operative connections between said lever and the said frame, substantially as described.

5. In a variable-speed driving-gear, the combination with a shaft, of a toothed wheel fast thereon, a frame loosely mounted on said shaft, bushes adjustably mounted in said frame, spindles supported eccentrically in said bushes, pinions mounted on said spindles, and meshing with said toothed wheel, an independent pulley secured to each of said pinions, and means for securing said bushes in position in the frame, substantially as described.

ALFRED EDWARD CREESE.

Witnesses:
C. G. REDFERN,
A. ALBUTT.